United States Patent [19]

Johnson

[11] Patent Number: 4,902,145
[45] Date of Patent: Feb. 20, 1990

[54] BALL SEPARATOR FOR BEARING ASSEMBLY

[75] Inventor: James P. Johnson, Sugar Grove, Ill.

[73] Assignee: Emerson Electric Co., St. Louis, Mo.

[21] Appl. No.: 364,878

[22] Filed: Jun. 12, 1989

[51] Int. Cl.⁴ .......................... F16C 33/38; F16C 33/44
[52] U.S. Cl. ..................................... 384/530; 384/470; 384/527
[58] Field of Search ................ 384/470, 523, 526–530, 384/572, 576, 578, 579

[56] References Cited

U.S. PATENT DOCUMENTS

| | | | |
|---|---|---|---|
| 1,996,841 | 4/1935 | Stevens | 384/547 |
| 2,525,622 | 10/1950 | Shafer | 384/530 |
| 2,861,849 | 11/1958 | Case | 384/547 |
| 3,256,051 | 6/1966 | Howe | 384/527 |
| 3,539,231 | 11/1970 | Langstrom | 384/470 |
| 3,832,023 | 8/1974 | Fairbank | 384/527 |
| 4,118,259 | 10/1978 | Bingle et al. | 384/579 X |
| 4,126,362 | 11/1978 | Hamblin et al. | |
| 4,324,444 | 4/1982 | Buczynski et al. | 384/526 |
| 4,568,206 | 2/1986 | Imazaike | 384/530 |

FOREIGN PATENT DOCUMENTS 2062128 5/1981 United Kingdom ................ 384/470

*Primary Examiner*—Thomas R. Hannon
*Attorney, Agent, or Firm*—Aubrey L. Burgess

[57] ABSTRACT

A separator for the balls of a ball bearing assembly, especially of the land riding variety which is constructed of two like parts joined together by ultrasonic welding. The separator is provided with generally cylindrical ball receiving pockets. Skis are provided on the circumference of the separator which ride on the lands of the bearing. Each part of the separator is formed with alternating studs and bores, which, when two parts are assembled, the bores receive the opposing studs. The structure is so formed to insure the flow of lubricant to the raceways.

11 Claims, 2 Drawing Sheets

BALL SEPARATOR FOR BEARING ASSEMBLY

FIELD OF INVENTION

This invention relates to ball bearings and particularly to ball separators of the land riding variety for use in such assemblies.

BACKGROUND OF THE INVENTION

Ball bearing assemblies comprise inner and outer races having raceways with a plurality of anti-friction elements in the form of hardened steel balls therebetween. It is desirable to circumferentially space the balls and it is customary to provide a ball separator for this purpose, the separator being positioned between the inner and outer races of the bearing. Usually the raceways are hardened grooves and are flanked by lands which extend outwardly therefrom. In some bearing assemblies, the retainer/spacer is referred to as "land riding", i.e., the retainer/spacer contacts and rides on the lands of the outer race.

In the past, ball bearing separators have been constructed of two metal members riveted together. The metals used have included brass and steel, and steel separators with plastic coatings thereon have been used. It has also been known to injection mold plastic members and join them together to form a completed separator. Other plastic retainer/spacers are of one piece with flexible "wipers" between the ball pockets, the wipers retaining the balls in their respective pockets.

DISCUSSION OF PRIOR ART

U.S. Pat. No. 1,996,841 issued Apr. 9, 1935, teaches a ball separator comprising a ring having a metal shell and a ring of bakelite material with openings for the anti-friction elements.

U.S. Pat. No. 2,861,849 issued Nov. 15, 1958, teaches a separator for anti-friction bearings comprising two alike annular parts, each having radially oriented pockets. When joined cylindrical pockets are formed, each to receive a ball for a ball bearing assembly. Each part of the separator is provided with alternating studs and stud receiving bores or openings. The studs and openings are so formed that the parts snap and lock together.

U.S Pat. No. 4,126,362 issued Nov. 21, 1978, teaches a one piece plastic cage or retainer/spacer for a ball bearing assembly in which flexible wipers are disposed between the ball receiving pockets.

BRIEF DESCRIPTION OF THE INVENTION

The ball bearing separator of this invention comprises a pair of like annular members joined together. Each member, formed by injection molding of a thermoplastic, such as a glass filled nylon, is joined to the other by ultrasonic welding.

Each member of the separator comprises an annular part having radially oriented pocket parts or cavities, such that when the two parts are joined, ball receiving pockets are defined. Each ball receiving pocket is generally cylindrical and each member is provided with spaced skis, i.e., circumferential raised portions, on the circumference, each ski being located between two pocket parts. The skis are adaptable to engage and ride on the lands of the outer raceway when the bearing is assembled.

Each separator member is formed with radial flats or lands, each of which is located between the next adjacent pocket parts and alternating flats or lands are provided with axially extending studs and bores which alternate with one another. When two parts are assembled, one part is rotated with respect to the other so that the studs of one part are received in the bores of the other part. When ultrasonically welded together, the bore and the stud therein become integral with one another.

The separator, as will be further explained herein with reference to the drawings, is provided with a plurality of side facing lubricant recesses to retain and distribute lubricant, usually a grease, to the balls and their raceways. The skis, because they are not continuous, permit lubricant to flow to the balls and their pockets and return by a vortex action to the grease pockets.

DETAILED DESCRIPTION OF THE PREFERRED EMBODIMENTS

Figure 1:
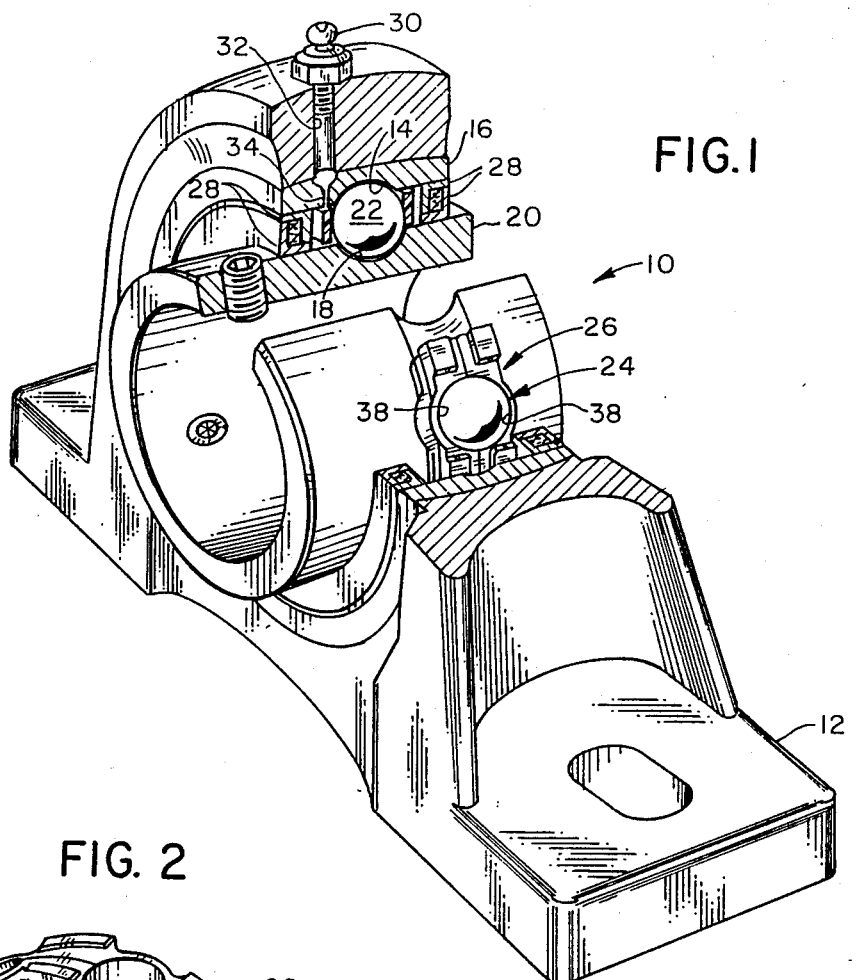
FIG. 1 is a perspective view of a typical single row ball bearing assembly incorporating this invention, with parts broken away.
Figure 2:
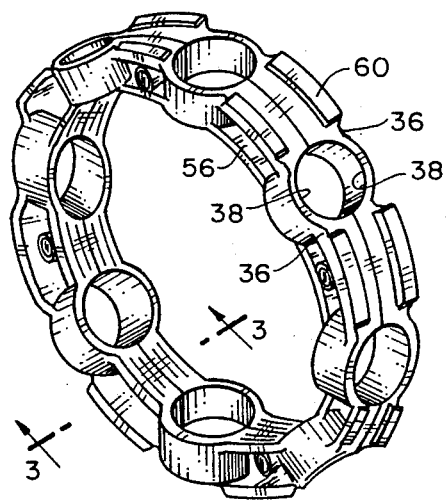
FIG. 2 is a perspective view of a ball separator constructed according to this invention.

FIG. 1 illustrates a typical single row ball bearing assembly 10, incorporating the invention described herein, with a portion in section. The bearing assembly 10 comprises a pillow block 12, an outer bearing raceway 14 in an outer race 16, an inner bearing raceway 18 in an inner race 20, a plurality of anti-friction balls 22, each received in a ball pocket 24 in a ball separator 26, and a pair of end seals 28, 28 spanning the space between the race 16 and 20. A lubricant fitting 30 is provided for supplying lubricant to the separator 26 and the balls 22 located therein. The fitting 30 is received in a passageway 32 in the pillow block 12 which is aligned with a passageway 34 through the outer race 16.

The separator 26 (see FIGS. 2 to 6) comprises a pair of annular members 36, 36 which are identical. Thus only one mold is necessary to form the annular members. Each member 36 has a plurality of equally spaced open ended and radially oriented ball pocket halves 38, which, as previously described, when assembled with a companion member, form a cylindrical ball pocket, each to receive and separate a ball from the adjacent ball in the bearing assembly. The open ended ball pocket halves 38 are spaced circumferentially by shoulders or flats 40, each of which includes a radially flat portion 42 adapted to abut and engage the corresponding portion on the cooperating and oppositely disposed shoulder or flat 40 of the other member 36 of the pair of members.

Alternate shoulders or flats 40 of each part 36 are formed with axially projecting studs 44 while the remaining alternate shoulders or flats 40 are formed with bores 46 to receive the opposing studs of the opposite member 36 of the pair of members. Thus alternate shoulders or flats of each member 36 have studs 44 and bores 46 which when assembled for welding provide the means for aligning the two members and, when welded, bonding them together.

Figure 3:
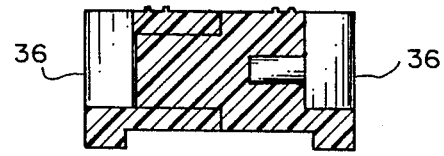
FIG. 3 is a sectional view taken on line 3—3 of FIG. 2 and in the direction of the arrows.

The projecting studs 44 have a portion 48 with a diameter slightly larger than the diameter of the bores 46, and a terminal portion 50 having a diameter slightly smaller than the diameter of the bore 46. The bores (see FIG. 6) have a tapered portion 52 intersecting the flat portions of the members 36 and a portion 54 adapted to receive the portion 50 of a stud. This construction provides for aligning the two members 36 during assembly before they are welded together. Once welded together, the studs and their bores become an integral unit, as indicated in FIG. 3.

Each of the annular members 36 is formed to define lubricant recesses 56 at the outside thereof, the recesses retaining lubricant introduced through the lubricant fitting 30 for the proper operation of the assembly. To insure the distribution of lubricant to the bearing raceways and the balls 22 from the recesses 56, the outer periphery of each part 36 is under at 58 and the outer periphery of each part 36 is formed with spaced, circumferentially extending skis 60, each ski being located between adjacent balls pockets 24. Because the skis 60 to not extend completely around the separator 26, the passage of lubricant around the separator is insured.

Figure 4:
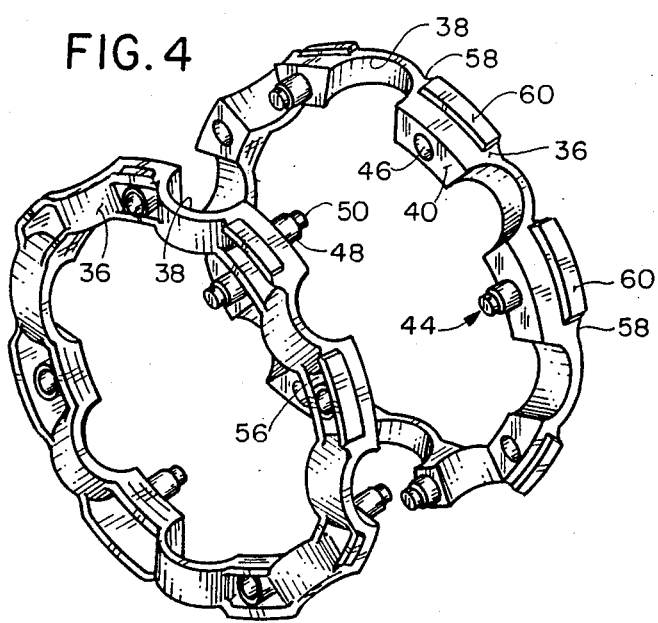
FIG. 4 is a perspective view of the two parts of a ball separator constructed according to this invention before being joined together.
Figure 5:
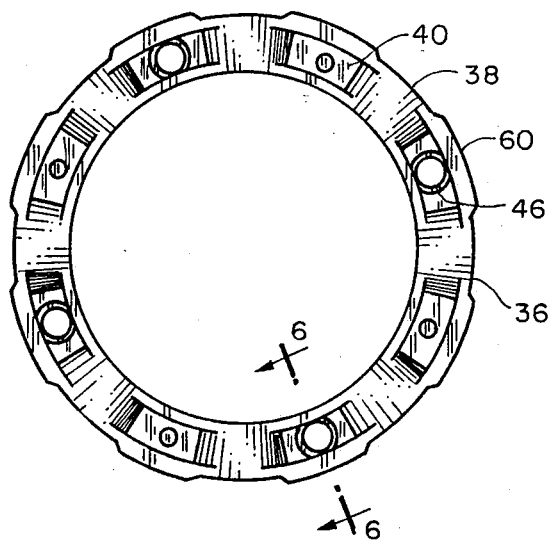
FIG. 5 is a view of one of the two parts of a ball separator according to this invention.
Figure 6:
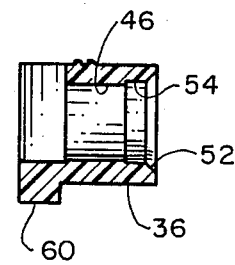
FIG. 6 is a sectional view taken on line 6—6 of FIG. 5 and looking in the direction of the arrows.

To construct the separator 26 of this invention, the two parts 36 are assembled as shown in FIG. 4, and high frequency vibration and pressure are applied to ultrasonically weld the parts together. In the ultrasonic welding of the parts, heat is generated by friction as the result of the high frequencies because of the displacement (vibration) of one of the parts relative to the other, as is known in the art. In so doing, the studs shear and melt into the opening and the two members are joined as one, see FIG. 3. The particular stud and bore configuration is known as a "shear" joint.

The appended claims are intended to cover all equivalents and to be interpreted as broadly as the prior art will permit.

I claim:

1. A ball separator for a ball bearing assembly having inner and outer raceways defining cylindrical lands, comprising:
    a pair of like members of generally annular configuration joined together, each member having a plurality of spaced open ended pockets having a generally semi-cylindrical configuration;
    a plurality of spaced studs extending axially from each member and alternating axially directed bores;
    each stud having a terminal portion of a diameter substantially the same as a diameter of a bore and a second portion of a diameter in excess of a diameter of a bore; and
    a plurality of circumferentially spaced skis extending outwardly from the circumference of each member and between each pocket;
    said axially extending studs of one member being received in the bores of the other member and integrated therewith when said members are subjected to ultrasonic vibrations and pressure to weld the members together;
    each stud being melted under said ultrasonic vibrations and pressure so that said second portion thereof conforms to the diameter of the bore in which it is received.

2. A ball separator as recited in claim 1, wherein said pair of like members are constructed of a glass filled plastic.

3. A ball separator as recited in claim 1, further comprising a plurality of radially oriented flats, each of which is located between two adjacent open ended pockets, the flat on one member abutting a flat on the other member when the two members are joined together.

4. A ball separator as recited in claim 3, further comprising cavities defined by each flat for retaining lubricant for said bearing assembly.

5. A ball separator as recited in claim 3, wherein alternate flats have axially extending studs and the other flats have bores therein.

6. A land riding ball separator for use in a ball bearing assembly having inner and outer raceways with cylindrical lands flanking the raceways;
    said separator comprising a cylindrical member having a plurality of substantially equally and circumferentially spaced and radially directed ball receiving pockets, each defined by a continuous wall;
    a plurality of skis equally located around the circumference of each cylindrical member, said skis continually engaging and riding on at least one of the lands of the outer raceways; and
    recesses in said cylindrical members for retaining lubricant for distribution to the balls of said bearing assembly.

7. A separator as recited in claim 6, wherein each ball receiving pocket is generally circular in section.

8. A separator as recited in claim 6, in which said skis alternate circumferentially with said pockets and a pair of spaced skis are located between each of the next adjacent pockets.

9. A separator as recited in claim 6, wherein said cylindrical member is constructed of a pair of like plastic parts joined together.

10. A separator as recited in claim 9, further comprising alternating projecting studs on each part and bores in each part, whereby the studs and bores alternate with one another and when assembled, a stud is received in each bore.

11. A separator as recited in claim 10, wherein each stud has a terminal portion of a diameter substantially the same as a diameter of a bore and a second portion of a diameter in excess of the diameter of a bore, and wherein each stud is melted under ultrasonic vibrations and the second portion conforms to the diameter of the bore under pressure to form an integral joint.

* * * * *